United States Patent

(12) United States Patent
Sugino et al.

(10) Patent No.: US 8,471,835 B2
(45) Date of Patent: Jun. 25, 2013

(54) RECEIVER AND SIGNAL TRANSMISSION SYSTEM

(75) Inventors: Heiichi Sugino, Shinagawa (JP); Takashi Sato, Shinagawa (JP)

(73) Assignee: Fujitsu Component Limited, Tokyo (JP)

(*) Notice: Subject to any disclaimer, the term of this patent is extended or adjusted under 35 U.S.C. 154(b) by 905 days.

(21) Appl. No.: 12/585,117

(22) Filed: Sep. 3, 2009

(65) Prior Publication Data

US 2010/0053454 A1  Mar. 4, 2010

(30) Foreign Application Priority Data

Sep. 4, 2008 (JP) ................................. 2008-227536

(51) Int. Cl.
*H04N 5/38* (2006.01)

(52) U.S. Cl.
USPC .......................................................... 345/204

(58) Field of Classification Search
None
See application file for complete search history.

(56) References Cited

U.S. PATENT DOCUMENTS

| | | | |
|---|---|---|---|
| 6,744,444 B2 * | 6/2004 | Minami et al. | 345/699 |
| RE40,411 E * | 7/2008 | Cooper | 348/525 |
| 7,558,348 B1 * | 7/2009 | Liu et al. | 375/346 |
| 7,765,074 B2 * | 7/2010 | Kim et al. | 702/66 |
| 2003/0126356 A1 * | 7/2003 | Gustavson et al. | 711/105 |
| 2004/0252239 A1 * | 12/2004 | Niiyama | 348/561 |

FOREIGN PATENT DOCUMENTS

JP  2004-356939  12/2004

* cited by examiner

*Primary Examiner* — Joseph Haley
*Assistant Examiner* — Emily Frank
(74) *Attorney, Agent, or Firm* — Staas & Halsey LLP

(57) ABSTRACT

A receiver includes: an adjustment circuit that adjusts an electric potential of a midpoint provided on a side of the receiver such that the electric potential of the midpoint provided between a pair of signal lines and on the side of the receiver is identical with an electric potential of a midpoint provided between the pair of signal lines and on a side of the transmitter, the transmitter transmitting a plurality of image signals, a vertical synchronizing signal, and a horizontal synchronizing signal, and transmitting and receiving differential signals on the pair of signal lines; a control circuit that controls the velocity of rise and decay of the differential signals which flow on the pair of signal lines; and a cancel circuit that cancels crosstalk by the vertical synchronizing signal generated on the horizontal synchronizing signal by inputting the vertical synchronizing signal.

13 Claims, 9 Drawing Sheets

RECEIVER AND SIGNAL TRANSMISSION SYSTEM

BACKGROUND OF THE INVENTION

1. Field of the Invention

The present invention relates to a receiver and a signal transmission system that can transmit image signals for a long distance (e.g. hundreds of meters).

2. Description of the Related Art

Conventionally, there has been known a signal transmission system including a local unit that transmits analog image signals (i.e., RGB signals) output from a computer and response signals to operation of a keyboard and a mouse, to a remote place with a Cat 5 (category 5) cable, and a remote unit that transmits operation signals of the keyboard and the mouse to the local unit, and receives the analog image signals and the response signals (see Japanese Laid-Open Patent Publication No. 2004-356939).

However, the signal transmission system does not execute complete balanced transmission on signal lines of the operation signals and the response signals of the keyboard and the mouse, and hence an EMI (Electro-Magnetic Interference) noise occurs. This EMI noise influences the analog image signals as so-called crosstalk, and the shake and the flicker of a screen are caused on a monitor of the remote place.

SUMMARY OF THE INVENTION

It is an object of the present invention to provide a receiver and a signal transmission system that can eliminate the shake and the flicker of a screen.

According to a first aspect of the present invention, there is provided a receiver including: an adjustment circuit that adjusts an electric potential of a midpoint provided on a side of the receiver such that the electric potential of the midpoint provided between a pair of signal lines and on the side of the receiver is identical with an electric potential of a midpoint provided between the pair of signal lines and on a side of the transmitter, the transmitter transmitting a plurality of image signals, a vertical synchronizing signal, and a horizontal synchronizing signal, and transmitting and receiving differential signals on the pair of signal lines; a control circuit that controls the velocity of rise and decay of the differential signals which flow on the pair of signal lines; and a cancel circuit that cancels crosstalk by the vertical synchronizing signal generated on the horizontal synchronizing signal by inputting the vertical synchronizing signal.

BRIEF DESCRIPTION OF THE DRAWINGS

Preferred embodiments of the present invention will be described in detail with reference to the following drawings, wherein.

DESCRIPTION OF THE PREFERRED EMBODIMENTS

A description will now be given, with reference to the accompanying drawings, of an embodiment of the present invention.

Figure 1:
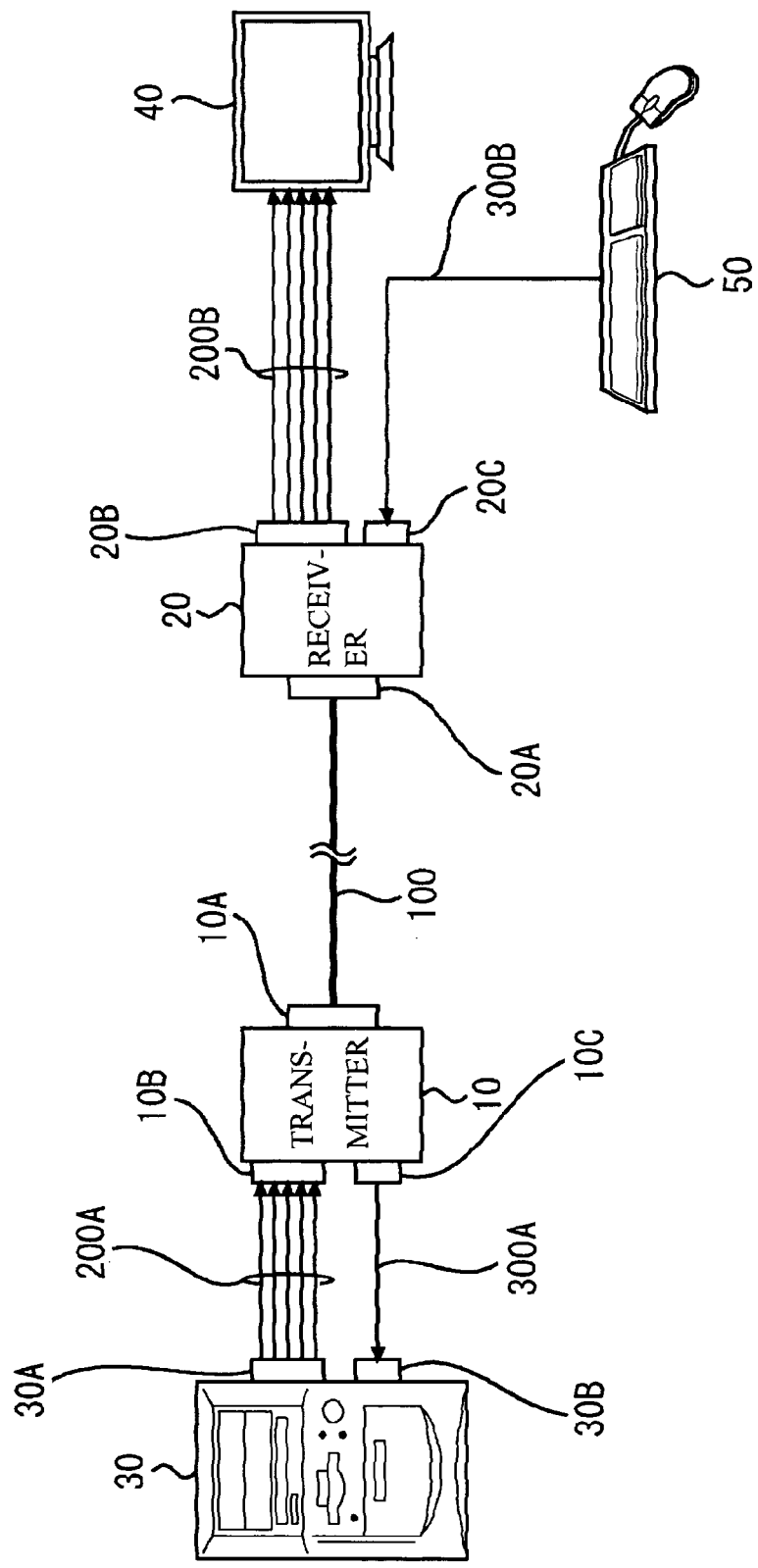
FIG. 1 is a block diagram showing the construction of a signal transmission system according to a present embodiment.

FIG. 1 is a block diagram showing the construction of a signal transmission system according to a present embodiment.

In the signal transmission system, a transmitter 10 and a receiver 20 are provided between a server 30, and a display 40 and a keyboard and mouse 50 (hereinafter referred to as "a keyboard/mouse 50"), as shown in FIG. 1. The server 30 is composed of a personal computer, a workstation, or the like.

The transmitter 10 and the receiver 20 are connected to each other via a LAN cable 100. Exclusive interfaces (I/Fs) 10A and 20A are incorporated into the transmitter 10 and the receiver 20, respectively. The exclusive I/Fs 10A and 20A connect the transmitter 10 to the receiver 20 by a one-on-one relationship. The exclusive I/F 10A transmits three image signals (RGB signals: hereinafter simply referred to as "an image signal" when the type of the image signal is not specified), a horizontal synchronizing signal (Hsync), and a vertical synchronizing signal (Vsync) (hereinafter referred to as "a synchronizing signal" when the type of synchronizing signal is not specified) to the exclusive I/F 20A, and receives a signal input from the keyboard/mouse 50 (hereinafter referred to as "an operation signal") from the exclusive I/F 20A. The exclusive I/F 20A receives the image signal and the synchronizing signal from the exclusive I/F 10A, and transmits the operation signal to the exclusive I/F 10A.

The LAN cable 100 is a Ca5E straight cable, and includes four pairs of signal lines (i.e., total 8 signal lines), for example. Each image signal is transmitted from the transmitter 10 to the receiver 20 as differential signals, and hence a pair of signal lines is occupied by each image signal. Therefore, three pairs of signal lines are occupied by the three image signals, i.e., the RGB signals. A pair of remaining signal lines is used for transmitting the operation signal input from the keyboard/mouse 50 from the receiver 20 to the transmitter 10, and transmitting a signal output from the server 30 from the transmitter 10 to the receiver 20. As described later, the horizontal synchronizing signal is multiplexed with the green signal (i.e., G signal), and the vertical synchronizing signal is multiplexed with the blue signal (i.e., B signal). Accordingly, each of the horizontal synchronizing signal and the vertical synchronizing signal does not independently occupy the signal line.

The transmitter 10 includes a VGA (Video Graphics Array) connector 10B as a display connector for inputting the image signals (RGB), the horizontal synchronizing signal, and the vertical synchronizing signal from the server 30. As the VGA connector 10B, a general connector such as a BNC (Bayonet Neill Concelman) connector, and a D-sub 15 pin connector can be used.

The transmitter 10 also includes a connector 10C for inputting the operation signal of the keyboard/mouse 50 input via the receiver 20, to the server 30.

Similarly to a general information processing apparatus, a VGA connector 30A outputting the image signals (RGB), and a connector 30B inputting the operation signal from a keyboard and a mouse are provided on the server 30. The VGA connector 10B provided on the transmitter 10 is connected to the VGA connector 30A provided on the server 30 via a RGB cable 200A composed of a BNC cable, a D-sub 15 pin cable, or the like. The connector 10C provided on the transmitter 10 is connected to the connector 30B provided on the server 30 via a cable 300 used for connecting a general keyboard and a general mouse. The connector 10C and the connector 30B are composed of a USB (Universal Serial Bus) connector, a PS/2 connector, or the like. The cable 300 is composed of a USB (Universal Serial Bus) cable, a PS/2 cable, or the like.

The receiver 20 includes a VGA connector 20B as a display connector for outputting the image signals (RGB), the horizontal synchronizing signal, and the vertical synchronizing signal to the display 40. As the VGA connector 20B, a general connector such as a BNC (Bayonet Neill Concelman) connector, and a D-sub 15 pin connector can be used. A RGB cable 200B provided on the display 40 is connected to the VGA connector 20B. For example, the RGB cable 200B is composed of the BNC cable, the D-sub 15 pin cable, or the like.

The receiver 20 includes a connector 20C for inputting the operation signal from the keyboard/mouse 50. A cable 300B provided on the keyboard/mouse 50 is connected to the connector 20C. The connector 20C is composed of the USB connector, the PS/2 connector, or the like. The cable 300 is composed of the USB cable, the PS/2 cable, or the like.

Next, a description will be given of details of the internal construction of the transmitter 10 and the receiver 20, with reference to the accompanying drawings. It should be noted that a description is given of an example in which the horizontal synchronizing signal is multiplexed with the image signal (G) from the RGB image signals, and the vertical synchronizing signal is multiplexed with the image signal (B).

Figure 2:
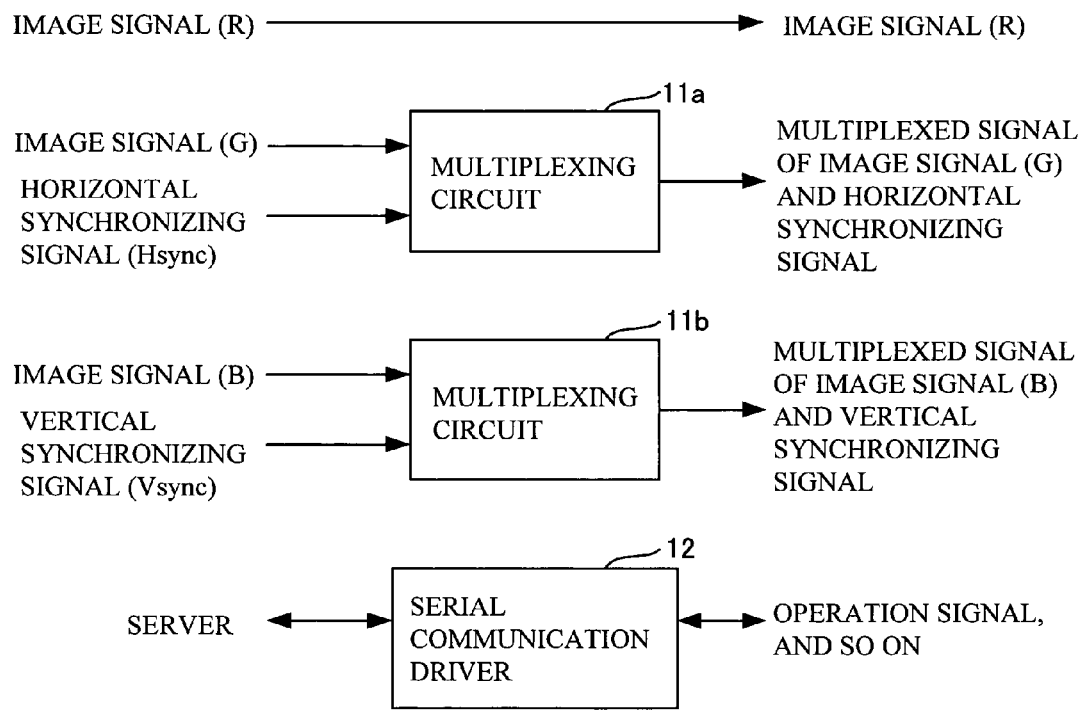
FIG. 2 is a block diagram showing the internal construction of a transmitter 10.

FIG. 2 is a block diagram showing the internal construction of the transmitter 10. As shown in FIG. 2, the transmitter 10 includes multiplexing circuits 11a and 11b and a serial communication driver 12 that multiplex the horizontal synchronizing signal with the image signal (G) from the image signals (RGB) input from the VGA connector 10B, and the vertical synchronizing signal with the image signal (B).

The multiplexing circuits 11a inputs the image signal (G) from the image signals (RGB), and the horizontal synchronizing signal, multiplexes the horizontal synchronizing signal with the image signal (G), and outputs a multiplexed signal to the receiver 20. Similarly, the multiplexing circuits 11b inputs the image signal (B) from the image signals (RGB), and the vertical synchronizing signal, multiplexes the vertical synchronizing signal with the image signal (B), and outputs a multiplexed signal to the receiver 20. It should be noted that a voltage level of general image signals (RGB) is about 1V even if it is high, and a voltage level of general synchronizing signals is about 5V equal to an internal voltage level. The serial communication driver 12 is composed of an RS-485 serial communication driver, outputs the operation signal received from the receiver 20 to the server 30, and transmits a signal from the server 30 to the receiver 20.

Figure 3:
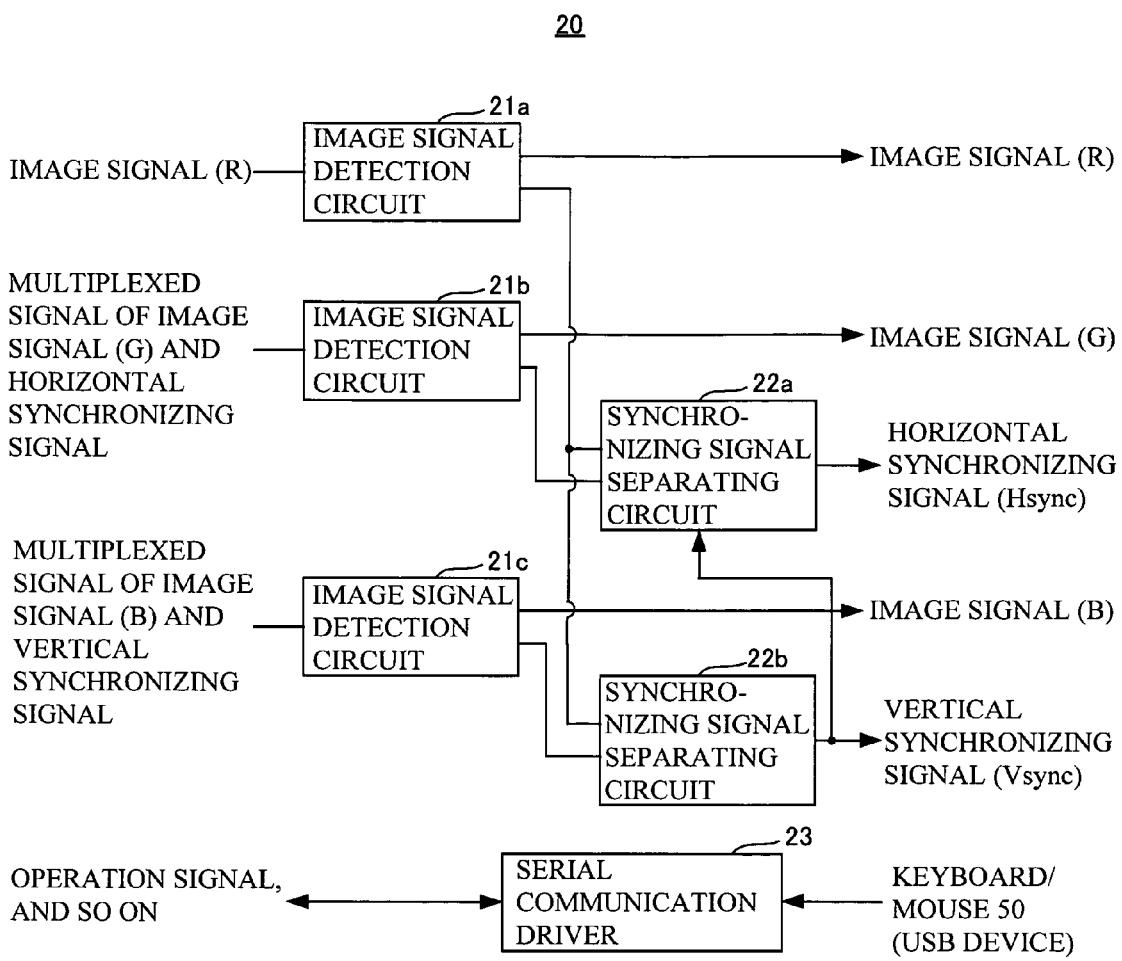
FIG. 3 is a block diagram showing the internal construction of a receiver 20.

FIG. 3 is a block diagram showing the internal construction of the receiver 20.

The receiver 20 includes image signal detection circuits 21a to 21c (detection circuits), synchronizing signal separating circuits 22a and 22b, and a serial communication driver 23. The synchronizing signal separating circuit 22a corresponds to a first synchronizing signal separating circuit, and the synchronizing signal separating circuit 22b corresponds to a second synchronizing signal separating circuit.

The image signal detection circuits 21a to 21c detect the image signal (R), the image signal (G), and the image signal (B) from plural signals received from the exclusive I/F 20A, respectively. The synchronizing signal separating circuit 22b separates the vertical synchronizing signal from a common-mode signal output from the image signal detection circuit 21c, based on a common-mode signal output from the image signal detection circuit 21a. Based on the common-mode signal and the vertical synchronizing signal output from the image signal detection circuit 21a, the synchronizing signal separating circuit 22a separates the horizontal synchronizing signal from which influence of the crosstalk by the vertical synchronizing signal is excluded, from a common-mode signal output from the image signal detection circuit 21b.

The serial communication driver 23 is composed of the RS-485 serial communication driver, outputs the operation signal received from the keyboard/mouse 50 to the transmitter 10, and transmits a signal from the transmitter 10 to a USB device, not shown.

Figure 4:
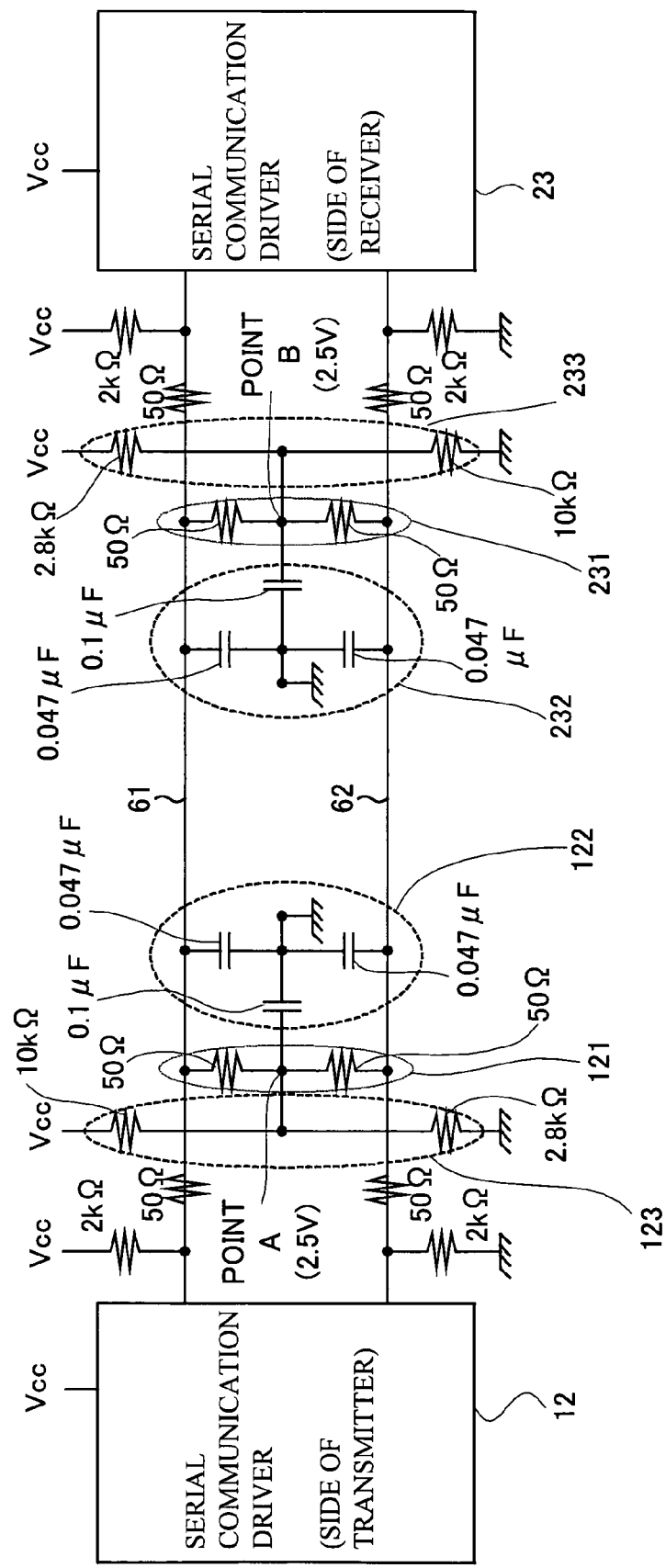
FIG. 4 is a diagram showing a connection state between a serial communication driver 12 and a serial communication driver 23.

FIG. 4 is a diagram showing a connection state between the serial communication driver 12 and the serial communication driver 23.

The serial communication drivers 12 and 23 perform interactive communication via a pair of signal lines 61 and 62. However, the interactive communication is not complete balanced transmission, so that the EMI noise occurs. This EMI noise influences the horizontal synchronizing signal as so-called crosstalk, and the shake and the flicker of a screen are caused on the display 40 of the remote place.

In the present embodiment, the electric potentials of midpoints A and B between the pair of signal lines are adjusted to about 2.5 volts (hereinafter simply referred to as "V"), so that the interactive communication performed between the serial communication drivers 12 and 23 becomes the balanced transmission. Signals interactively communicated between the serial communication drivers 12 and 23 are 1V in peak to peak. The reference voltage (i.e., center voltage of amplitude) of each of the signals is set to about 2.5V (i.e., voltage value of about half of a power-supply voltage Vcc), so that the balanced transmission is performed.

As shown in FIG. 4, terminating resistors 121 and 231, control circuits 122 and 232, and adjustment circuits 123 and 233 are provided between the serial communication drivers 12 and 23. The control circuits 122 and 232 control the velocity of rise and decay of signal pulses so that the signal pulses which flows on signal lines 61 and 62 gradually rise and decay. The adjustment circuits 123 and 233 adjust an operation point (i.e., a reference voltage) of the signal pulses which flows on signal lines 61 and 62, to about 2.5V.

The adjustment circuits 123 and 233 adjust the electric potentials of the midpoints between the pair of signal lines to an appropriate value (i.e., about 2.5V), so that the EMI noise reduces. The control circuits 122 and 232 properly reduce the velocity of rise and decay of the signal pulses which flows on signal lines 61 and 62, and hence higher harmonics waves are not easily radiated from the serial communication drivers 12 and 23. As a result, the EMI noise reduces.

Figure 5:
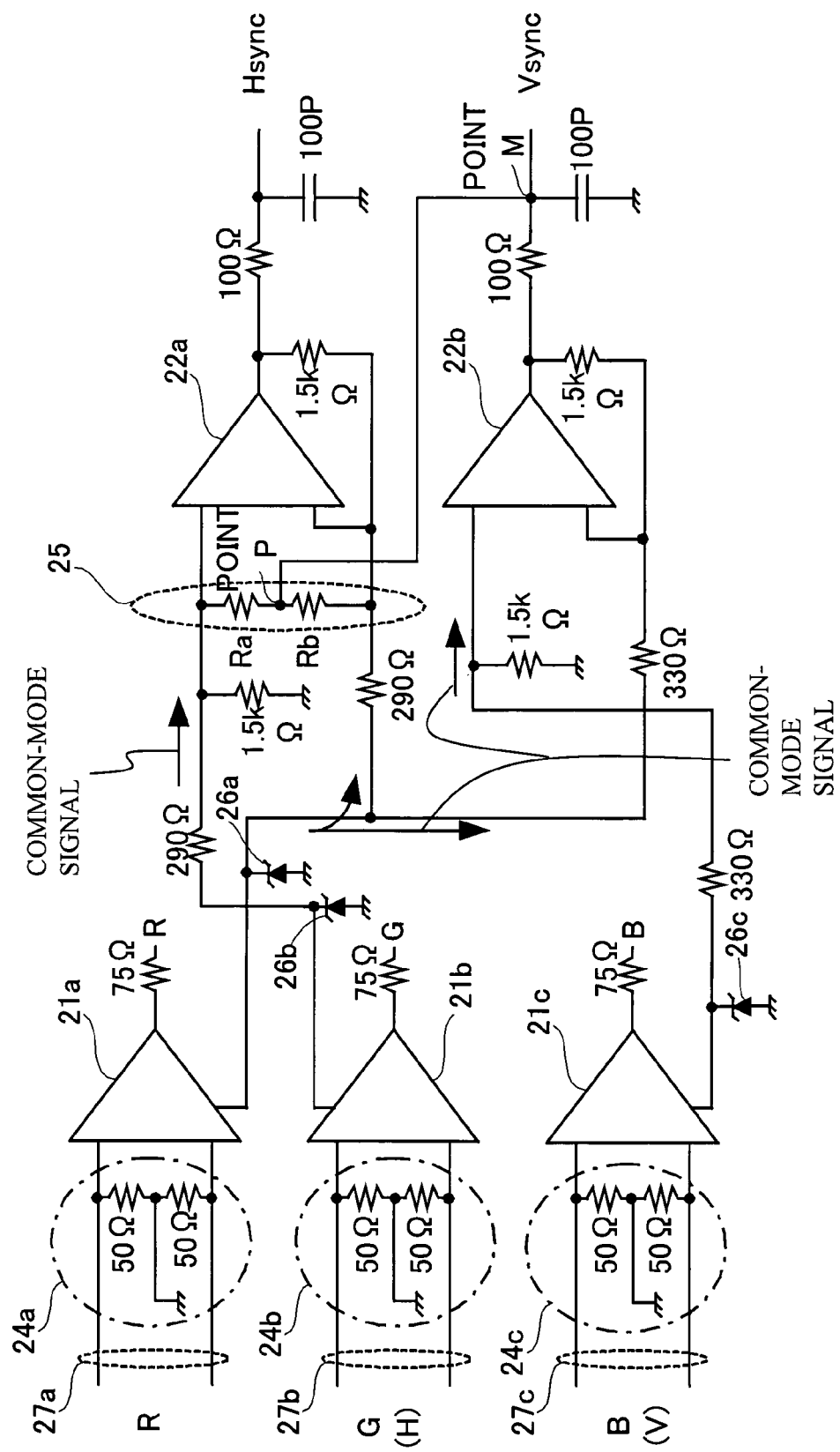
FIG. 5 is a diagram showing the detailed hardware construction of the receiver 20 except for the serial communication driver 23.

FIG. 5 is a diagram showing the detailed hardware construction of the receiver 20 except for the serial communication driver 23.

As shown in FIG. 5, terminating resistor circuits 24a to 24C are provided to input sides of the image signal detection circuits 21a to 21c, respectively. The terminating resistor circuits 24a to 24C is connected between three pairs of signal lines 27a to 27c, respectively. Each of the terminating resistor circuits 24a to 24C is composed of two resistors with 50Ω. A midpoint of the two resistors is grounded. The image signal detection circuits 21a to 21c outputs the image signal (R), the image signal (G), and the image signal (B), respectively, and outputs the common-mode signals.

A cancel circuit 25 which cancels the crosstalk by the vertical synchronizing signal is provided to an input side of the synchronizing signal separating circuit 22a. The cancel circuit 25 is composed of resistors Ra and Rb. A point P between the resistors Ra and Rb is connected to an output side of the synchronizing signal separating circuit 22b. Preferably, the ratio of the resistance values of the resistors Ra and Rb is 1:3.

As described above, the EMI noise which occurs by the interactive communication performed between the serial communication drivers 12 and 23 reduces by the control circuits 122 and 232, and the adjustment circuits 123 and 233. However, a remaining EMI noise makes the horizontal synchronizing signal and the vertical synchronizing signal change as the crosstalk.

Figure 6A:
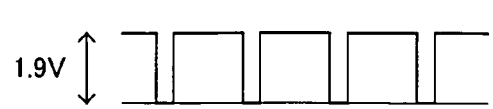
FIG. 6A is a diagram showing an enlarged example of an output waveform of a horizontal synchronizing signal.
Figure 6B:
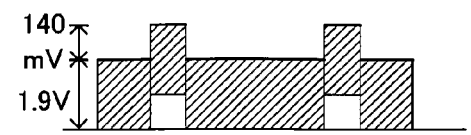
FIG. 6B is a diagram showing an enlarged example of an output waveform of a vertical synchronizing signal.
Figure 6C:
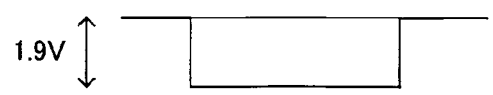
FIG. 6C is a diagram showing a reduced example of the output waveform of the horizontal synchronizing signal.

Here, FIG. 6A shows an enlarged example of an output waveform of the horizontal synchronizing signal, FIG. 6B shows an enlarged example of an output waveform of the vertical synchronizing signal, and FIG. 6C shows a reduced example of the output waveform of the horizontal synchronizing signal. As shown in FIGS. 6A and 6B, when the polar character of the horizontal synchronizing signal is positive, the polar character of the vertical synchronizing signal becomes negative. That is, the horizontal synchronizing signal is the output waveform having the electric potential reverse to the vertical synchronizing signal.

In FIG. 6C, when the vertical synchronizing signal is output, the output waveform of the horizontal synchronizing signal is lifted from a normal state by 140 mV, by the EMI noise. Thereby, the shake and the flicker of an image occur on the screen of the display 40.

Figure 6D:
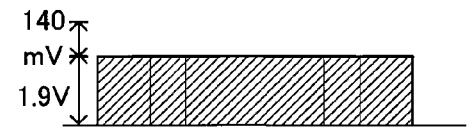
FIG. 6D is a diagram showing a reduced example of the output waveform of the horizontal synchronizing signal after crosstalk is eliminated by the vertical synchronizing signal.

In the present embodiment, an output point M of the synchronizing signal separating circuit 22b is connected to the point P between the resistors Ra and Rb, and the vertical synchronizing signal having the polar character opposite to the horizontal synchronizing signal is input to the cancel circuit 25. This removes the crosstalk by the vertical synchronizing signal that has an influence on the output of the horizontal synchronizing signal. FIG. 6D shows a reduced example of the output waveform of the horizontal synchronizing signal after the crosstalk by the vertical synchronizing signal is removed.

The three pairs of signal lines 27a to 27c which input the image signals are included in the LAN cable 100 in FIG. 1. There is a case where an impulse as the noise is included in the image signals that flow on the three pairs of signal lines 27a to 27c, by an external environment. This impulse negatively affects the vertical synchronizing signal and the horizontal synchronizing signal, and causes a blackout in which the image displayed on the display 40 becomes a single black color.

To avoid the blackout, zener diodes 26a to 26c are provided on output channels of the common-mode signals from the image signal detection circuits 21a to 21c, respectively, as shown in FIG. 5. The zener diodes 26a to 26c remove the noise (i.e., the impulse) added to the common-mode signals output from the image signal detection circuits 21a to 21c.

Figure 7:
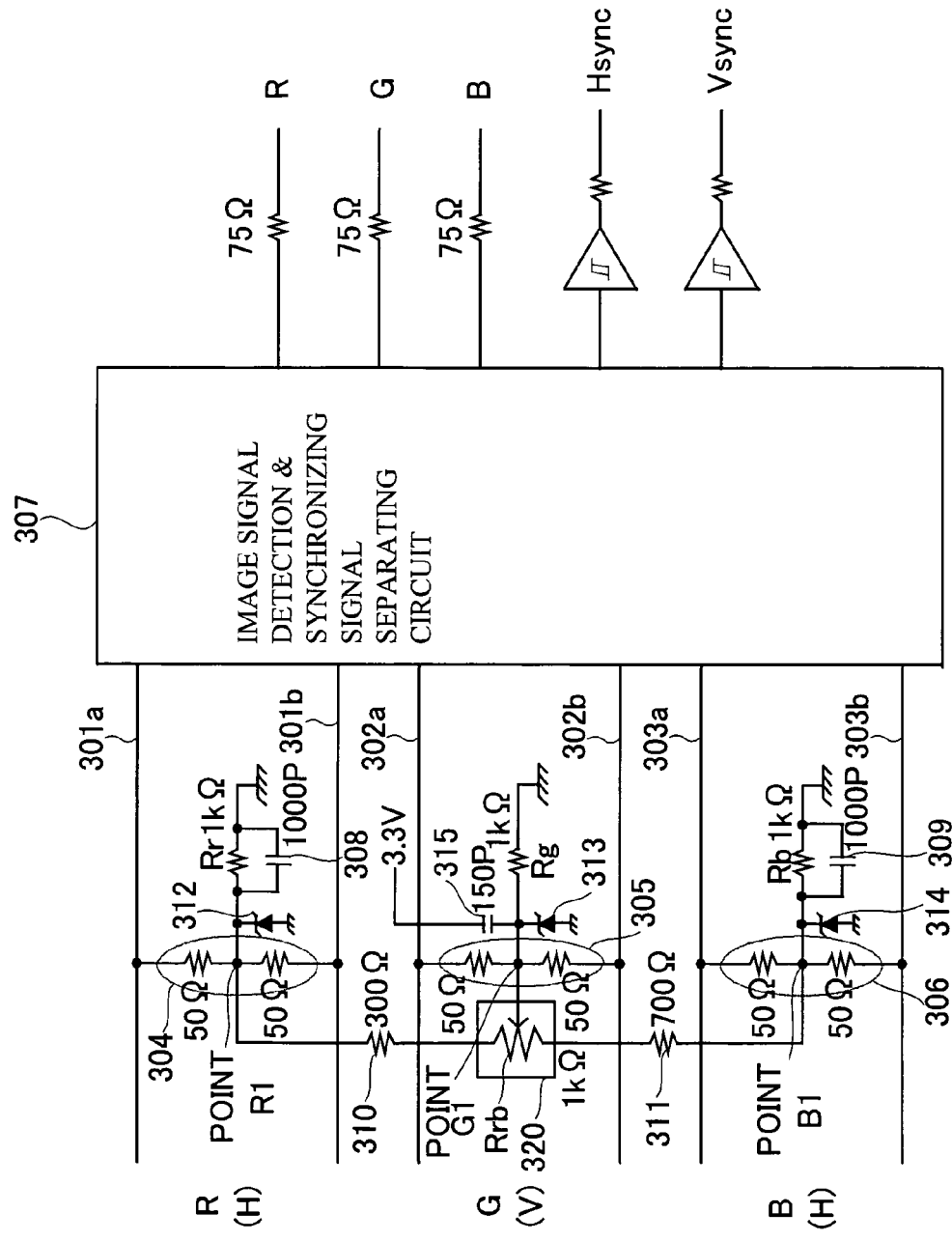
FIG. 7 is a diagram showing a first variation example of the detailed hardware construction of the receiver 20 except for the serial communication driver 23.

FIG. 7 is a diagram showing a first variation example of the detailed hardware construction of the receiver 20 except for the serial communication driver 23.

In this case, the horizontal synchronizing signal is multiplexed with the image signal (R) and the image signal (B), and the vertical synchronizing signal is multiplexed with image signal (G).

As shown in FIG. 7, the receiver 20 includes an image signal detection & synchronizing signal separating circuit 307. The image signal detection & synchronizing signal separating circuit 307 has the image signal detection circuits 21a to 21c, and the synchronizing signal separating circuits 22a and 22b in FIG. 3 built-in by a single chip. Therefore, the image signal detection & synchronizing signal separating circuit 307 has the same functions as the image signal detection circuits 21a to 21c, and the synchronizing signal separating circuits 22a and 22b in FIG. 3. Further, the image signal detection & synchronizing signal separating circuit 307 has a function automatically correcting a gain and an equalizer of the image signals and the synchronizing signals.

To the input side of the image signal detection & synchronizing signal separating circuit 307, three pairs of signal lines 301a, 301b, 302a, 302b, 303a, and 303b are connected. A terminating resistor 304 is provided between the signal lines 301a and 301b. A terminating resistor 305 is provided between the signal lines 302a and 302b, and a terminating resistor 306 is provided between the signal lines 303a and 303b. The signal lines 301a and 301b correspond to a first signal line group, the signal lines 302a and 302b correspond to a second signal line group, and the signal lines 303a and 303b correspond to a third signal line group.

One ends of a resistor Rr and a capacitor 308 are connected to a point R1 between the signal lines 301a and 301b, and other ends of the resistor Rr and the capacitor 308 are grounded. A zener diode 312 for removing the noise (i.e., the impulse added to the image signal (R) from an exterior) is connected between the point R1 and one ends of the resistor Rr and the capacitor 308.

A point G1 between the signal lines 302a and 302b is grounded via a resistor Rg. A zener diode 313 for removing the noise (i.e., the impulse added to the image signal (G) from the exterior) is connected between the point G1 and the resistor Gr. A power source of 3.3V is connected between the point G1 and the resistor Rg via a capacitor 315 for removing the noise.

One ends of a resistor Rb and a capacitor 309 are connected to a point B1 between the signal lines 303a and 303b, and other ends of the resistor Rb and the capacitor 309 are grounded. A zener diode 313 for removing the noise (i.e., the impulse added to the image signal (B) from the exterior) is connected between the point B1 and one ends of the resistor Rb and the capacitor 309.

Although it is considered that zener diodes for removing the noise are provided on all of three pairs of the signal lines, when the fluctuation between the voltages of the operation points of the respective image signals is caused, the effect on the noise is reduced by half. Therefore, each zener diode for removing the noise is connected to the midpoint of each pair of signal lines.

The point R1 is connected to the point B1 via the resistors 310, Rrb, and 311. The point G1 is connected to the resistor Rrb so as to be able to adjust the potential of the points R1 and G1.

The resistor Rrb composes an image quality adjusting volume switch 320. A user operates the image quality adjusting volume switch 320, and keeps electric potentials of the horizontal synchronizing signals as the common-mode signals of the points R1 and G1 in equilibrium. For example, a point which keeps electric potentials of the horizontal synchronizing signals as the common-mode signals of the points R1 and G1 in equilibrium is a position in which, when a gray screen is displayed on the display 40, a flicker is not generated in an upper part of the screen. At this time, since the vertical synchronizing signal (i.e., the waveform having the electric potential reverse to the horizontal synchronizing signals) multiplexed with the image signal (G) is input from the point G1 to the resistor Rrb, the crosstalk by the vertical synchronizing signal mixed to the horizontal synchronizing signals of the image signals (R) and (B) is removed.

As described above, the transmitter 20 in FIG. 7 includes the image quality adjusting volume switch 320 that makes the levels of the horizontal synchronizing signals as the common-mode signals multiplexed with the image signals (R) and (B) identical with each other, and simultaneously removes the crosstalk by the vertical synchronizing signal mixed to the horizontal synchronizing signals. Therefore, the transmitter 20 can remove the shake and the flicker of the image generated on the display 40.

Figure 8:
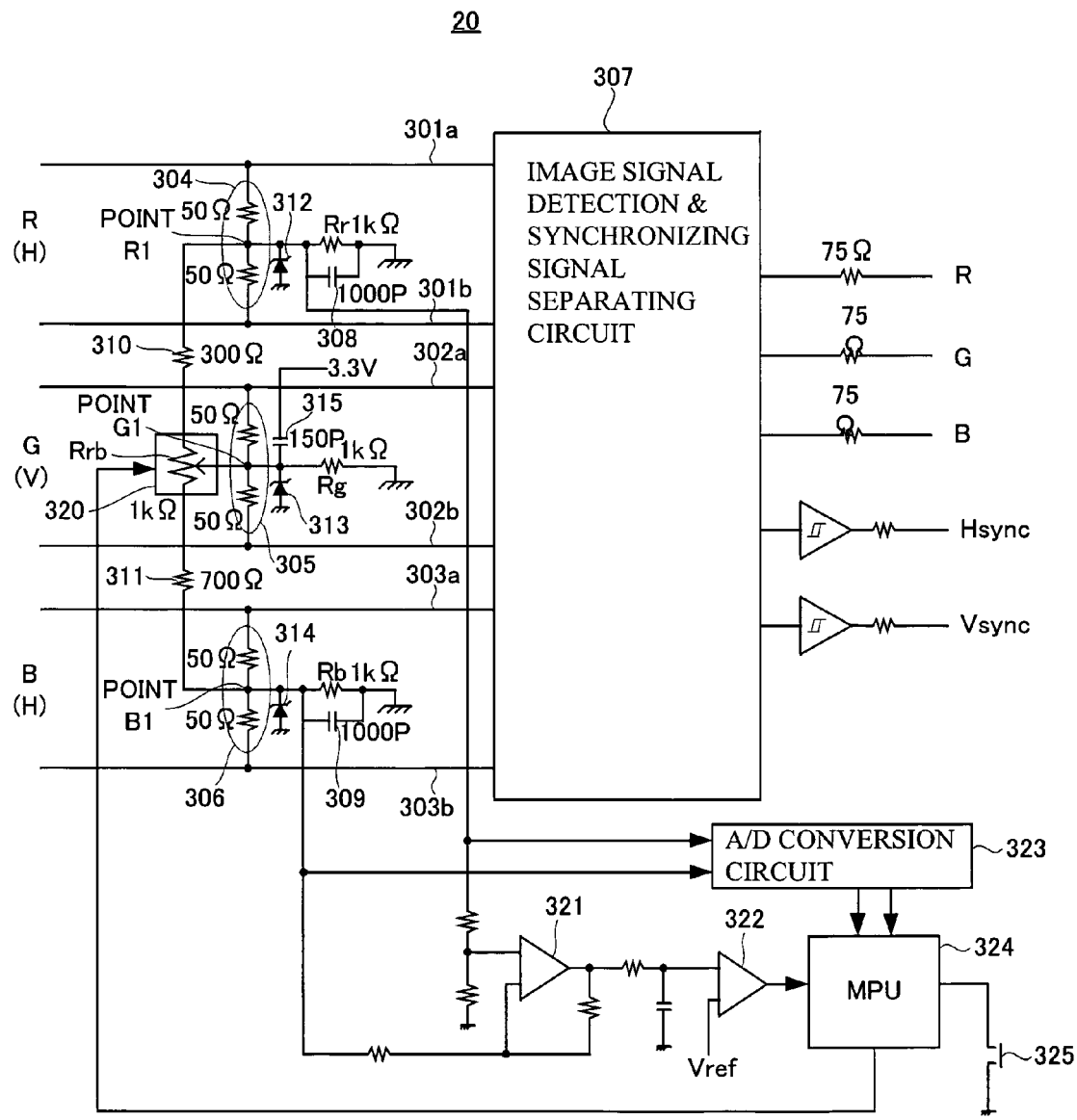
FIG. 8 is a diagram showing a second variation example of the detailed hardware construction of the receiver 20 except for the serial communication driver 23.

FIG. 8 is a diagram showing a second variation example of the detailed hardware construction of the receiver 20 except for the serial communication driver 23.

The construction in FIG. 8 adds a comparator 321, an A/D (Analog-to-Digital) converter 322, A/D conversion circuit 323, MPU (Micro Processing Unit) 324, and an automatic adjustment button 325 to the construction in FIG. 7. These elements correspond to an adjustment portion. Here, the image quality adjusting volume switch 320 is composed of an electric switch that automatically adjusts values of an R-side and a B-side of the resistor Rrb based on a control signal from the MPU 324.

The comparator 321 detects a difference between an electric potential of the horizontal synchronizing signal as the common-mode signal at the point R1, to which the crosstalk by the vertical synchronizing signal is mixed, and an electric potential of the horizontal synchronizing signal as the common-mode signal at the point G1, to which the crosstalk by the vertical synchronizing signal is mixed. The A/D converter 322 carries out A/D conversion on the output from the comparator 321. The A/D conversion circuit 323 carries out the A/D conversion on the electric potential of the horizontal synchronizing signal as the common-mode signal at the point R1, to which the crosstalk by the vertical synchronizing signal is mixed, and the electric potential of the horizontal synchronizing signal as the common-mode signal at the point G1, to which the crosstalk by the vertical synchronizing signal is mixed.

When the automatic adjustment button 325 is depressed, the MPU 324 outputs a control signal in which the difference between the electric potential of the horizontal synchronizing signal at the point R1, and the electric potential of the horizontal synchronizing signal at the point G1 vanishes, to the image quality adjusting volume switch 320.

Figure 9:
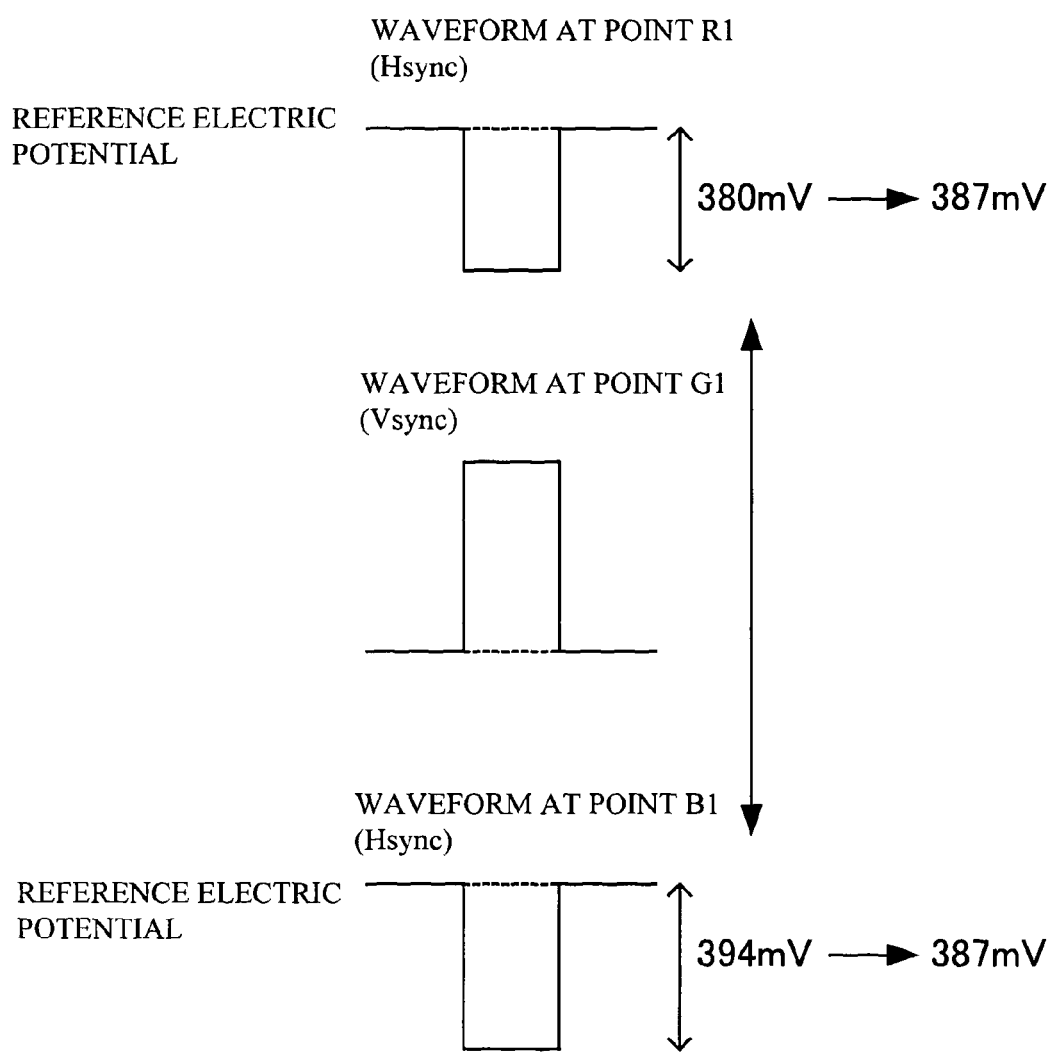
FIG. 9 is a diagram showing waveforms of points R1, G1, and B1 in which the crosstalk by the vertical synchronizing signal is mixed.

It is assumed that, as shown in FIG. 9, the electric potential of the horizontal synchronizing signal as the common-mode signal at the point R1, to which the crosstalk by the vertical synchronizing signal is mixed, reduces more than a reference electric potential by 380 mV, and the electric potential of the horizontal synchronizing signal as the common-mode signal at the point G1, to which the crosstalk by the vertical synchronizing signal is mixed, reduces more than the reference electric potential by 394 mV, for example. In this case, since the difference between both of the electric potentials is 14 mV, the MPU 324 outputs the control signal in which both of the electric potentials reduce more than the reference electric potential by 387 mV, to the image quality adjusting volume switch 320.

The image quality adjusting volume switch 320 adjusts the values of the R-side and the B-side of the resistor Rrb based on the control signal. At this time, since the vertical synchronizing signal multiplexed with the image signal (G) (i.e., the waveform having the electric potential reverse to the horizontal synchronizing signals) is input from the point G1 to the resistor Rrb, the crosstalk by the vertical synchronizing signal mixed to the horizontal synchronizing signals of the image signals (R) and (B) is removed.

Thus, the receiver 20 in FIG. 8 makes the levels of the horizontal synchronizing signals as the common-mode signals multiplexed with the image signals (R) and (B) identical with each other, and simultaneously removes the crosstalk by the vertical synchronizing signal mixed to the horizontal synchronizing signals. Therefore, the transmitter 20 can remove the shake and the flicker of the image generated on the display 40, and display the extremely clear image.

Although the serial communication driver 23 is not illustrated in FIGS. 7 and 8, the receiver 20 includes the serial communication driver 23 and the plural circuits in FIG. 4.

As described above, according to the present embodiment, the receiver 20 is connectable to the transmitter 10 that transmits the RGB image signals, the vertical synchronizing signal, the horizontal synchronizing signal, and transmits and receives the differential signals on the pair of signal lines. The receiver 20 includes: the adjustment circuit 233 that adjusts the electric potential of the midpoint provided on a side of the receiver 20 such that the electric potential of the midpoint provided between the pair of signal lines and on the side of the receiver 20 is identical with the electric potential of the midpoint provided between the pair of signal lines and on a side of the transmitter 10; the control circuit 233 that controls the velocity of rise and decay of the differential signals which flow on the pair of signal lines; and the cancel circuit 25 that cancels the crosstalk by the vertical synchronizing signal generated on the horizontal synchronizing signal by inputting the vertical synchronizing signal.

Therefore, the adjustment circuit 233 and the control circuit 233 control the generation of the EMI noise that has an influence on the communication of the image signal, and the cancel circuit 25 cancels the crosstalk by the vertical synchronizing signal generated on the horizontal synchronizing signal depending on a remaining EMI noise. Thereby, the shake and the flicker of the image in the screen can be removed. As a result, the display 40 can display the extremely clear image.

Although the zener diodes 26a to 26c are used as diodes for removing the noise or the zener diode 313 is used as a diode for removing the noise, a schottky diode for removing the noise may be used.

It should be noted that the present invention is not limited to those embodiments, and various modifications may be made to them without departing from the scope of the invention.

The present application is based on Japanese Patent Application No. 2008-227536 filed Sep. 4, 2008, the entire disclosure of which is hereby incorporated by reference.

What is claimed is:

1. A receiver that communicates with a transmitter a plurality of image signals, a vertical synchronizing signal, and a horizontal synchronizing signal, each of the image signals being transmitted as a different signal through a different pair of signal lines, the receiver comprising:
   an adjustment circuit that adjusts an electric potential at a midpoint between signal lines forming a pair on a side of the receiver such that the electric potential at the midpoint between the signal lines and on the side of the receiver is identical with an electric potential at a midpoint between the signal lines on a side of the transmitter;
   a control circuit that controls the velocity of rise and decay of the differential signals which flow on the corresponding pair of signal lines; and
   a cancel circuit that receives the vertical synchronizing signal and the horizontal synchronizing signal and cancels crosstalk on the horizontal synchronizing signal caused by the vertical synchronizing signal.

2. The receiver as claimed in claim 1, further comprising:
   a first synchronizing signal separating circuit that separates the horizontal synchronizing signal multiplexed with at least one of the image signals from the at least one of the image signals; and
   a second synchronizing signal separating circuit that separates the vertical synchronizing signal multiplexed with another one of the image signals from the corresponding image signal,
   wherein the vertical synchronizing signal has an electric potential of a polar character opposite to the horizontal synchronizing signal,
   the cancel circuit is composed of two resistors connected in series between two input ports of the first synchronizing signal separating circuit, and
   an output port of the second synchronizing signal separating circuit is connected between the two resistors via a signal line.

3. The receiver as claimed in claim 2, further comprising a plurality of detection circuits that detect the image signals,
   wherein a plurality of diodes are provided on a plurality of signal lines connected between the detection circuits and the first and second synchronizing signal separating circuits.

4. The receiver as claimed in claim 1, further comprising:
   first signal lines and second signal lines on which two horizontal synchronizing signals multiplexed with two of the image signals flow as the differential signals, respectively; and
   third signal lines on which the vertical synchronizing signal multiplexed with another one of the image signals flows as the differential signals,
   wherein the vertical synchronizing signal has an electric potential of a polar character opposite to the horizontal synchronizing signal,
   the cancel circuit includes a plurality of resistors connected between a midpoint of a first terminating resistor and a midpoint of a second terminating resistor, the first terminating resistor being provided between the first signal lines, and the second terminating resistor being provided between the second signal lines, and
   one of the plurality of resistors is connected to a midpoint of a third terminating resistor so as to enable the adjustment of a resistance value, the third terminating resistor being provided between the third signal lines.

5. The receiver as claimed in claim 4, further comprising:
   a detection portion that detects an electric potential difference between the midpoint of the first terminating resistor and the midpoint of the second terminating resistor; and
   an adjustment portion that automatically adjusts the resistance value of the resistor connected to the midpoint of the third terminating resistor such that the electric potential difference detected by the detection portion vanishes.

6. The receiver as claimed in claim 4, wherein a plurality of diodes are connected to the midpoints of the first to third terminating resistors, respectively.

7. A signal transmission system having a transmitter and a receiver, the receiver communicating with a transmitter a plurality of image signals, a vertical synchronizing signal, and a horizontal synchronizing signal, each of the image signals being transmitted as a different signal through a different pair of signal lines, the signal transmission system comprising:
   the transmitter including:
      a first adjustment circuit that adjusts an electric potential at a midpoint between signal lines forming a pair on a side of the transmitter such that an electric potential of a midpoint between signal lines on the side of the receiver is identical with the electric potential of the midpoint between the signal lines on the side of the transmitter; and
      a first control circuit that controls the velocity of rise and decay of the differential signals which flow on the corresponding pair of signal lines; and
   the receiver including:
      a second adjustment circuit that adjusts the electric potential at the midpoint between signal lines on the side of the receiver such that the electric potential at the midpoint between the signal lines on the side of the receiver is identical with the electric potential at the midpoint between the signal lines on the side of the transmitter;
      a second control circuit that controls the velocity of rise and decay of the differential signals which flow on the corresponding pair of signal lines; and
      a cancel circuit that receives the vertical synchronizing signal and the horizontal synchronizing signal, and cancels crosstalk on the horizontal synchronizing signal caused by the vertical synchronizing signal.

8. The signal transmission system as claimed in claim 7, wherein the receiver further includes:
   a first synchronizing signal separating circuit that separates the horizontal synchronizing signal multiplexed with at least one of the image signals from the at least one of the image signals; and
   a second synchronizing signal separating circuit that separates the vertical synchronizing signal multiplexed with another one of the image signals from the corresponding image signal, and
   wherein the vertical synchronizing signal has an electric potential of a polar character opposite to the horizontal synchronizing signal,
   the cancel circuit is composed of two resistors connected in series between two input ports of the first synchronizing signal separating circuit, and
   an output port of the second synchronizing signal separating circuit is connected between the two resistors via a signal line.

9. The signal transmission system as claimed in claim 8, wherein the receiver further includes a plurality of detection circuits that detect the image signals, and wherein a plurality of diodes are provided on a plurality of signal lines connected between the detection circuits and the first and second synchronizing signal separating circuits.

10. The signal transmission system as claimed in claim 7, wherein the receiver further includes:
    first signal lines and second signal lines on which two horizontal synchronizing signals multiplexed with two of the image signals flow as the differential signals, respectively; and
    third signal lines on which the vertical synchronizing signal multiplexed with another one of the image signals flows as the differential signals, and
        wherein the vertical synchronizing signal has an electric potential of a polar character opposite to the horizontal synchronizing signal,
    the cancel circuit includes a plurality of resistors connected between a midpoint of a first terminating resistor and a midpoint of a second terminating resistor, the first terminating resistor being provided between the first signal lines, and the second terminating resistor being provided between the second signal lines, and
    one of the plurality of resistors is connected to a midpoint of a third terminating resistor so as to enable the adjustment of a resistance value, the third terminating resistor being provided between the third signal lines.

11. The signal transmission system as claimed in claim 10, wherein the receiver further includes:
    a detection portion that detects an electric potential difference between the midpoint of the first terminating resistor and the midpoint of the second terminating resistor; and
    an adjustment portion that automatically adjusts the resistance value of the resistor connected to the midpoint of the third terminating resistor such that the electric potential difference detected by the detection portion vanishes.

12. The signal transmission system as claimed in claim 10, wherein a plurality of diodes are connected to the midpoints of the first to third terminating resistors, respectively.

13. A receiver that communicates with a transmitter, the receiver comprising:
    an adjustment circuit that adjusts an electric potential at a midpoint between signal lines forming a pair on a side of the receiver such that the electric potential at the midpoint between the signal lines on the side of the receiver is identical with an electric potential at a midpoint between the signal lines on a side of the transmitter;
    a control circuit that controls velocity of rise and decay of differential signals which flow on the corresponding pair of signal lines; and
    a cancel circuit that receives a vertical synchronizing signal and a horizontal synchronizing signal and cancels crosstalk on the horizontal synchronizing signal caused by the vertical synchronizing signal.

* * * * *

UNITED STATES PATENT AND TRADEMARK OFFICE
CERTIFICATE OF CORRECTION

PATENT NO.         : 8,471,835 B2
APPLICATION NO.    : 12/585117
DATED              : June 25, 2013
INVENTOR(S)        : Heiichi Sugino et al.

Page 1 of 1

It is certified that error appears in the above-identified patent and that said Letters Patent is hereby corrected as shown below:

In the Claims

Column 9, Line 10, In Claim 1, delete "and on" and insert -- on --, therefor.

Signed and Sealed this
Eighth Day of October, 2013

Teresa Stanek Rea
*Deputy Director of the United States Patent and Trademark Office*